(12) United States Patent
Hayami

(10) Patent No.: US 9,916,149 B2
(45) Date of Patent: Mar. 13, 2018

(54) INFORMATION PROCESSING APPARATUS, CONTROL METHOD FOR INFORMATION PROCESSING APPARATUS, AND STORAGE MEDIUM OF PROGRAM FOR EXECUTING CONTROL METHOD

(71) Applicant: CANON KABUSHIKI KAISHA, Tokyo (JP)

(72) Inventor: Yoshikazu Hayami, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/977,781

(22) Filed: Dec. 22, 2015

(65) Prior Publication Data

US 2016/0188310 A1 Jun. 30, 2016

(30) Foreign Application Priority Data

Dec. 26, 2014 (JP) .................................. 2014-265014

(51) Int. Cl.
*G06F 9/445* (2006.01)

(52) U.S. Cl.
CPC .................................... *G06F 8/61* (2013.01)

(58) Field of Classification Search
CPC ............ G06F 8/61; G06F 8/60; G06F 9/44505
USPC ......................................................... 717/174
See application file for complete search history.

(56) References Cited

U.S. PATENT DOCUMENTS

| 8,365,164 B1 * | 1/2013 | Morgenstern ............. G06F 8/61 |
| | | 717/108 |
| 8,739,151 B1 * | 5/2014 | Racz ......................... G06F 8/67 |
| | | 717/168 |
| 9,086,938 B2 | 7/2015 | Hayami |
| 2008/0077682 A1 * | 3/2008 | Nair .................. G06F 17/30115 |
| | | 709/223 |

(Continued)

FOREIGN PATENT DOCUMENTS

| JP | 2006-178534 A | 7/2006 |
| JP | 2012-048428 A | 3/2012 |

(Continued)

OTHER PUBLICATIONS

Japanese Office Action issued in corresponding application No. 2014265014 dated Nov. 8, 2016.

(Continued)

*Primary Examiner* — Anna Deng

(74) *Attorney, Agent, or Firm* — Carter, Deluca, Farrell & Schmidt, LLP

(57) ABSTRACT

An information processing apparatus includes: a detection unit configured to detect a connection of a portable medium storing a plurality of applications, the plurality of applications containing a first type of application and a second type of application that is added to the first type of application to enhance functionality of the first type of application; an installation unit configured to install, in response to a detection by the detection unit, the first type of application first and then install the second type of application among the plurality of applications stored in the portable medium; and a control unit configured to start, after installation by the installation unit, the first type of application after enabling the second type of application.

9 Claims, 14 Drawing Sheets

(56) References Cited

U.S. PATENT DOCUMENTS

| | | | | |
|---|---|---|---|---|
| 2008/0201705 A1* | 8/2008 | Wookey | ............... | G06F 8/68 |
| | | | | 717/175 |
| 2011/0035742 A1* | 2/2011 | Shenfield | ............ | G06F 9/44521 |
| | | | | 717/171 |
| 2015/0244798 A1* | 8/2015 | Bolotin | ............... | H04L 67/1095 |
| | | | | 709/217 |

FOREIGN PATENT DOCUMENTS

| | | |
|---|---|---|
| JP | 2014-059772 A | 4/2014 |
| JP | 2014-142824 A | 8/2014 |

OTHER PUBLICATIONS

Japanese Decision of Refusal issued in corresponding application No. 2014265014 dated Jun. 13, 2017.

\* cited by examiner

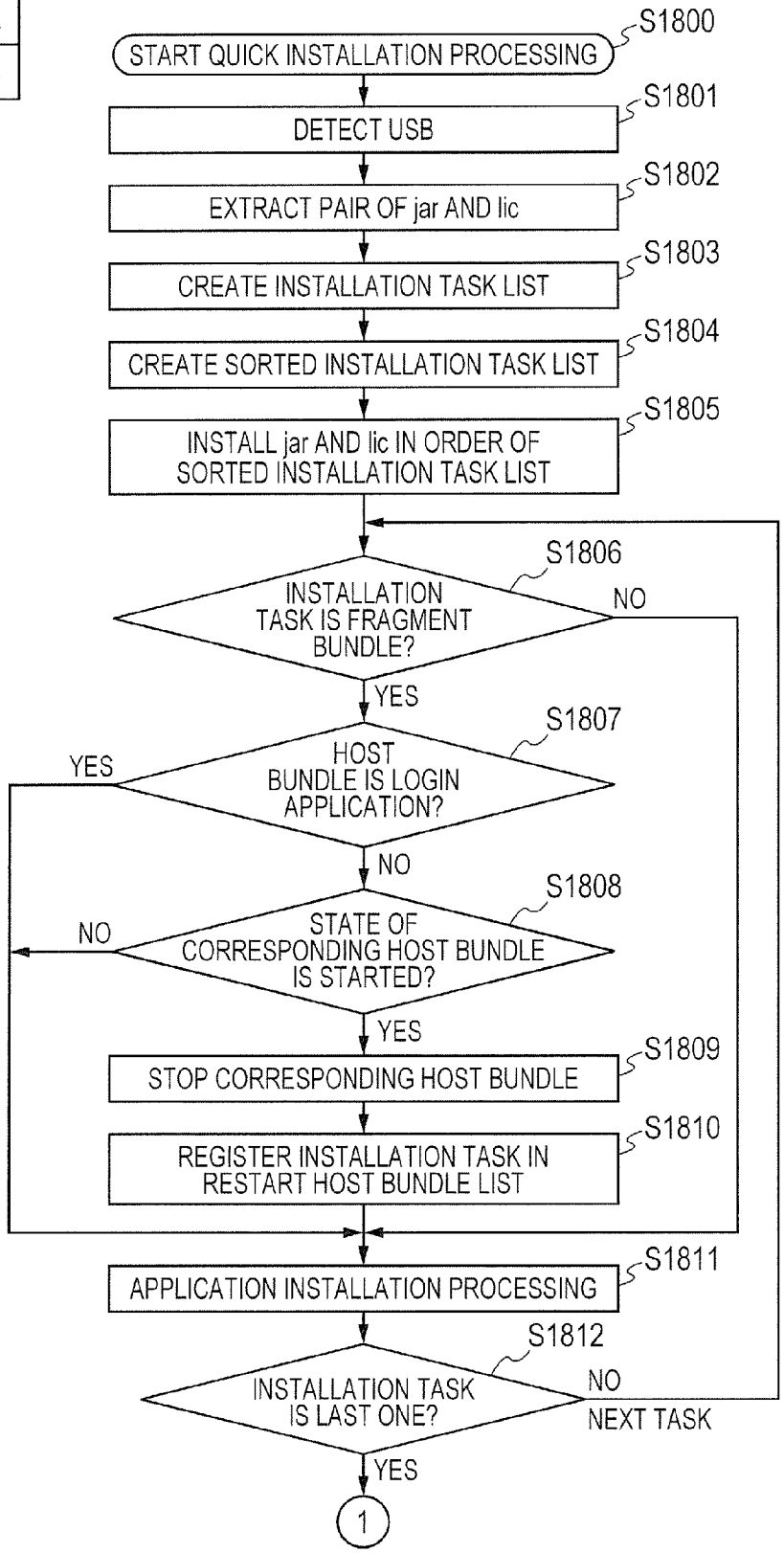

INFORMATION PROCESSING APPARATUS, CONTROL METHOD FOR INFORMATION PROCESSING APPARATUS, AND STORAGE MEDIUM OF PROGRAM FOR EXECUTING CONTROL METHOD

BACKGROUND OF THE INVENTION

Field of the Invention

The present invention relates to an installation method for an application program (hereinafter referred to as "application").

Description of the Related Art

In recent years, an image forming apparatus has been provided with an application operating environment as represented by a JAVA environment (trademark). There is proposed a technology for providing an extensible application by utilizing program portability of JAVA (trademark). In order to achieve improvement in functionality and usability of the image forming apparatus, an application that operates on an environment such as the JAVA (trademark) environment is created and installed onto the image forming apparatus, to thereby be able to realize desired functionality by this application.

There is known Open Services Gateway Initiative Service Platform (hereinafter referred to as "OSGi") as an application platform, which is a JAVA (trademark) application platform for embedded devices. In OSGi, a bundle is defined as a management unit of a software module, and a specification for managing a lifecycle, which includes install/start/stop/update/uninstall, is defined. In this context, the "bundle" refers to a JAVA (trademark) module. This kind of application platform can provide an application with embedded functions such as copy, scan, and print.

Hitherto, there is known a method of installing an application onto the image forming apparatus from a client terminal via a network. However, such an installation method requires prior setting of a network or the like, and thus puts a burden on an installing user. In view of this, there is proposed a system in which driver software is placed in a flash memory as represented by a USB memory and when insertion of this memory into a device such as an image forming apparatus is detected, the driver software placed in this memory is installed. This system is described, for example, in Japanese Patent Application Laid-Open No. 2006-178534 (JP2006-178534A). Through the application of this system, a conceivable method is to place an application and a license for decoding the application in a flash memory instead of the driver software and to install the application when insertion of this flash memory into an image forming apparatus is detected. Further, setting the installed application to a started state enables convenient usage of an application simply by inserting a USB, thereby alleviating a workload on the user.

However, the types of OSGi bundles include a host bundle and a fragment bundle, and attention needs to be paid to an order of installation and start due to a restriction on the fragment bundle as described below when taking those applications into consideration.

The fragment bundle is a bundle that does not operate independently and adds (attach) the bundle itself to a class loader space of the host bundle. The OSGi convention requires that the host bundle be stopped when this fragment bundle is installed (restriction 1). Further, when the fragment bundle is installed, the host bundle absolutely needs to be installed in advance because the fragment bundle does not operate independently (restriction 2).

When this order dependence is considered, it is conceivable to place a configuration file describing the order of installation by the user in the flash memory in advance, and execute the installation in accordance with the order. However, in order to achieve this, there is a problem in that the user preparing for the flash memory (USB memory) needs to recognize the host bundle and the fragment bundle, thereby causing a burden on the user.

SUMMARY OF THE INVENTION

According to one embodiment of the present invention devised in order to solve the above-mentioned problem, there is provided an information processing apparatus, including: a detection unit configured to detect a connection of a portable medium storing a plurality of applications, the plurality of applications containing a first type of application and a second type of application that is added to the first type of application to enhance functionality of the first type of application; an installation unit configured to install, in response to a detection by the detection unit, the first type of application first and then install the second type of application among the plurality of applications stored in the portable medium; and a control unit configured to start, after installation by the installation unit, the first type of application after enabling the second type of application.

The present invention is directed toward a technology for storing an application and a license in a flash memory, and installing the application when triggered by insertion of the flash memory into an image forming apparatus. According to the one embodiment of the present invention, even when the application contains a host bundle and a fragment bundle, the application may be installed simply by storing the application arbitrarily in the same manner as the normal application.

Further features of the present invention will become apparent from the following description of exemplary embodiments with reference to the attached drawings.

BRIEF DESCRIPTION OF THE DRAWINGS

FIG. 18, comprising FIGS. 18A and 18B, is a flowchart for illustrating quick installation of an application containing the fragment bundle by taking the state of the host bundle into consideration according to the second embodiment.

DESCRIPTION OF THE EMBODIMENTS

Now, a description is given of exemplary embodiments to implement the present invention with reference to the drawings. First, terms to be used in the following description are defined.

DEFINITION OF TERMS

The term "bundle" refers to a JAVA (trademark) module, and has the same meaning as an application in the present invention.

The term "host bundle" refers to a bundle to which a fragment bundle is added.

The term "fragment bundle" refers to a bundle that does not operate independently and adds itself to a class loader space of a host bundle. This bundle is assumed to be used as a plug-in application for adding a function as necessary.

Adding a fragment bundle to a host bundle, that is, attaching a fragment bundle to a host bundle is hereinafter referred to as "installation of fragment bundle". Note that, in the specification of OSGi, there is a relationship of host bundle:fragment bundle=1:N, and the fragment bundle can only be added to one host bundle. In this case, "OSGi" is an abbreviation of Open Services Gateway Initiative.

The term "normal application" refers to a bundle that is not a fragment bundle or a host bundle.

The term "quick installation" refers to an installation method by which bundles and licenses are placed in a USB memory, and those bundles are installed when triggered by insertion of that USB memory into an image forming apparatus so as to proceed to a started state after the installation completion.

<Background and Problem of Quick Installation>

First, with reference to FIG. 1 to FIG. 7, a description is given of a background and a problem of quick installation, which are common to all the embodiments described later. Further, with reference to FIG. 8 to FIG. 11, a description is given of quick installation of a normal application, which is a basic form of related-art quick installation.

Figure 1:
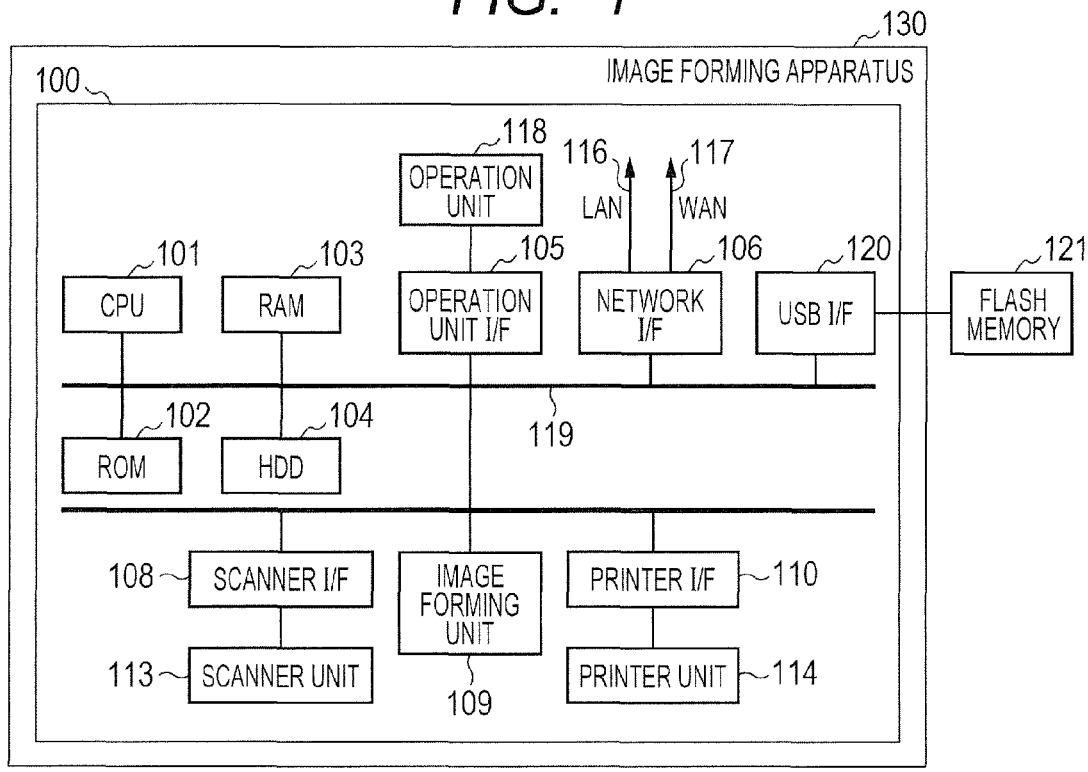
FIG. 1 is a hardware configuration diagram of an image forming apparatus.

FIG. 1 is a hardware configuration diagram of an information processing apparatus (image forming apparatus) 130 including a print function, a scan function, a network communication function, and the like. A controller 100 is a controller configured to control the image forming apparatus 130. The controller 100 is electrically connected to a scan unit 113 and a printer unit 114 while connected to an external device via a LAN 116.

Figure 3:
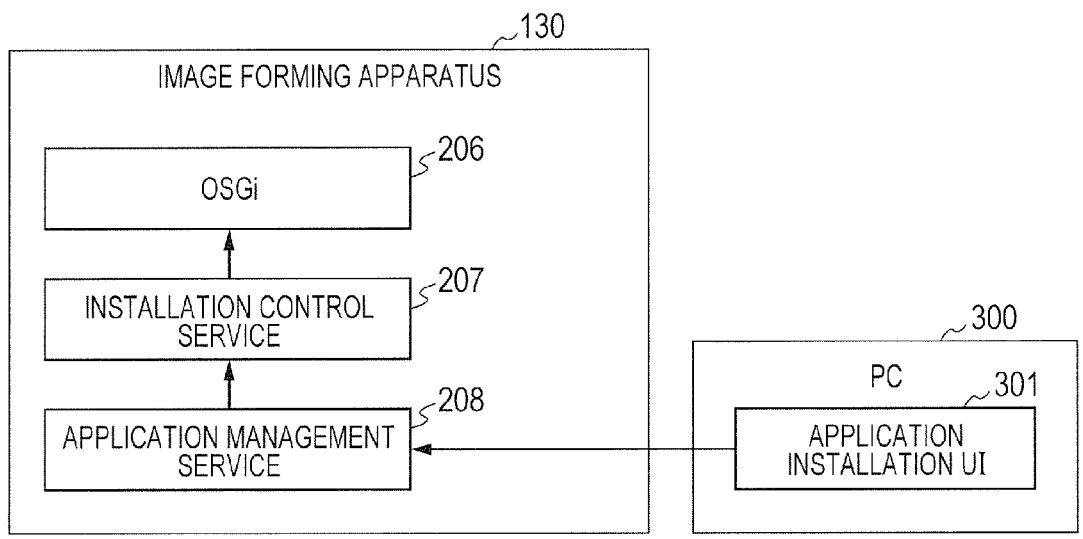
FIG. 3 is a block diagram for illustrating a flow of installing an application.

A CPU 101 integrally controls accesses to various pieces of connected hardware based on control programs and the like stored in a ROM 102, and also integrally controls various types of processing carried out inside the controller. The ROM 102 is a non-volatile read-only storage area, and stores a boot program of the image forming apparatus 130. A RAM 103 is a system work memory for the CPU 101 to operate thereon, and is a memory configured to temporarily store various types of data. This RAM 103 is formed of, for example, an FRAM and an SRAM, which can hold stored contents after power-off, and a DRAM, whose stored contents are deleted after the power-off. An HDD 104 is a non-volatile storage area, and stores a system application. Firmware containing an application to be installed, which is described with reference to FIG. 3, is stored in the HDD 104.

An operation unit I/F 105 is an interface unit configured to connect a system bus 119 to an operation unit 118. Specifically, the operation unit I/F 105 receives and displays data to be displayed on the operation unit 118 from the system bus 119 as well as outputs input information from the operation unit 118 to the system bus 119. A user gives an instruction or presents information to the image forming apparatus 130 via the operation unit 118. A network I/F 106 is connected to the LAN 116, a WAN 117, and the system bus 119, and inputs/outputs information from/to the outside.

A scanner I/F 108 corrects, processes, and edits image data received from the scan unit 113. An image forming unit 109, for example, changes a direction of an image, compresses an image, and extends image data. A printer I/F 110 receives the image data sent from the image forming unit 109, and the printer unit 114 prints this image data after formation of the image. A USB interface 120 is a general interface configured to connect various types of peripheral equipment to the image forming apparatus 130, and controls connection to USB. In this case, a flash memory 121 is connected as a portable medium.

Figure 2:
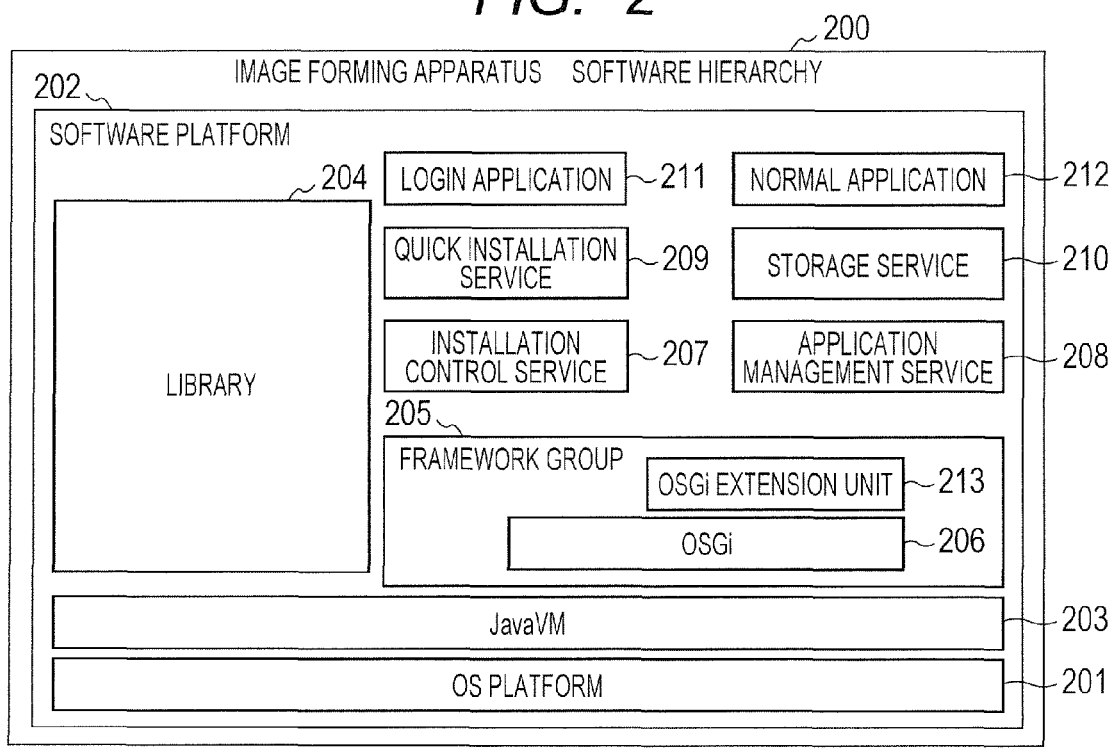
FIG. 2 is a software module hierarchical diagram of the image forming apparatus.

FIG. 2 is a software module hierarchical diagram of the image forming apparatus 130. Note that, each piece of software illustrated in FIG. 2 and subsequent figures is stored in the ROM 102 or the HDD 104, and executed by the CPU 101. Further, various types of information to be used in execution are held in the RAM 103 or the HDD 104 for exchange of various types of information between software functions. Further, communication to/from external devices is carried out using the network I/F 106.

Software contains an operating system (hereinafter referred to as "OS") platform 201, and a software platform 202 is constructed on the OS 201. The software platform 202 is constructed as a runtime environment of a JAVA (trademark) VM 203, and contains the JAVA (trademark) VM 203 as an interpreter, a library 204, and a framework group 205. The library 204 contains a standard Application Programming Interface (API) library.

The framework group 205 contains an OSGi 206, and the OSGi 206 allows a plurality of applications to operate on the single JAVA (trademark) VM 203. Further, an OSGi extension unit 213 is indicated to enable extending functions to the OSGi 206 as necessary. The OSGi 206 provides a management function of an application life cycle and a communication function between applications. When the image forming apparatus 130 is started, the OSGi 206 starts system services such as a login application 211, an installation control service 207, and an application management service 208 described later in accordance with a service start order list stored in the HDD 104. On this OSGi 206, a plurality of system services are pre-installed. The system services include the application management service 208 for managing a plurality of application groups to carry out an addition of a new application, an update, and a deletion. The application management service 208 uses the installation control service 207 to carry out an addition, an update, and a deletion of an application. Further, the application management service 208 provides a UI intended for application management as a servlet application.

A storage service 210 is a service that manages the flash memory 121. When the flash memory 121 is connected to the image forming apparatus 130, the USB interface 120 recognizes the connection of the flash memory 121, and communicates the connection to the storage service 210 via a USB driver. The contents of the flash memory 121 are communicated to the USB interface 120 via the USB driver to be able to be grasped by the user.

A quick installation service 209 is a service that controls quick installation, and when recognizing the connection of the flash memory 121, the quick installation service 209 extracts an application appropriate for the connected device in a manner described later to execute the quick installation. The recognition of the connection to the USB storage at this time is realized by registering an event listener with the storage service 210.

The login application 211 is an application for managing a login user. The login application 211 has a possibility of being inquired about login information at any time by any application during login, and therefore has an application characteristic in that the login application 211 cannot stop. When the login application is stopped, the login information cannot be acquired, and hence an application that uses data associated with the login information fails to retrieve data, resulting in its operational trouble. In this case, the login information refers to information such as a login name or an e-mail address of the user who currently logs in to the image forming apparatus 130. The login application 211 has the above-mentioned characteristic, and hence at least one login application 211 always operates during an activation of the image forming apparatus 130. The login application 211 can be provided in the form of a host bundle and a fragment bundle as described with reference to FIG. 4.

A normal application 212 carries out various types of processing for the user in the image forming apparatus 130. For example, the normal application 212 includes applications for processing of an image, compression of an image, and department management such as a print restriction. The normal application 212, which realizes various types of functions, operates under the management of the application management service 208. The application management service 208 holds, for example, application information containing a version of an application that is added under the management of the application management service 208, and license information. Further, in response to an instruction of uninstalling an application within the image forming apparatus 130, the application management service 208 excludes the normal application 212 from management targets. The normal application 212 can be provided in the form of a host bundle and a fragment bundle of FIG. 4 in the same manner as the login application 211.

Figure 5:
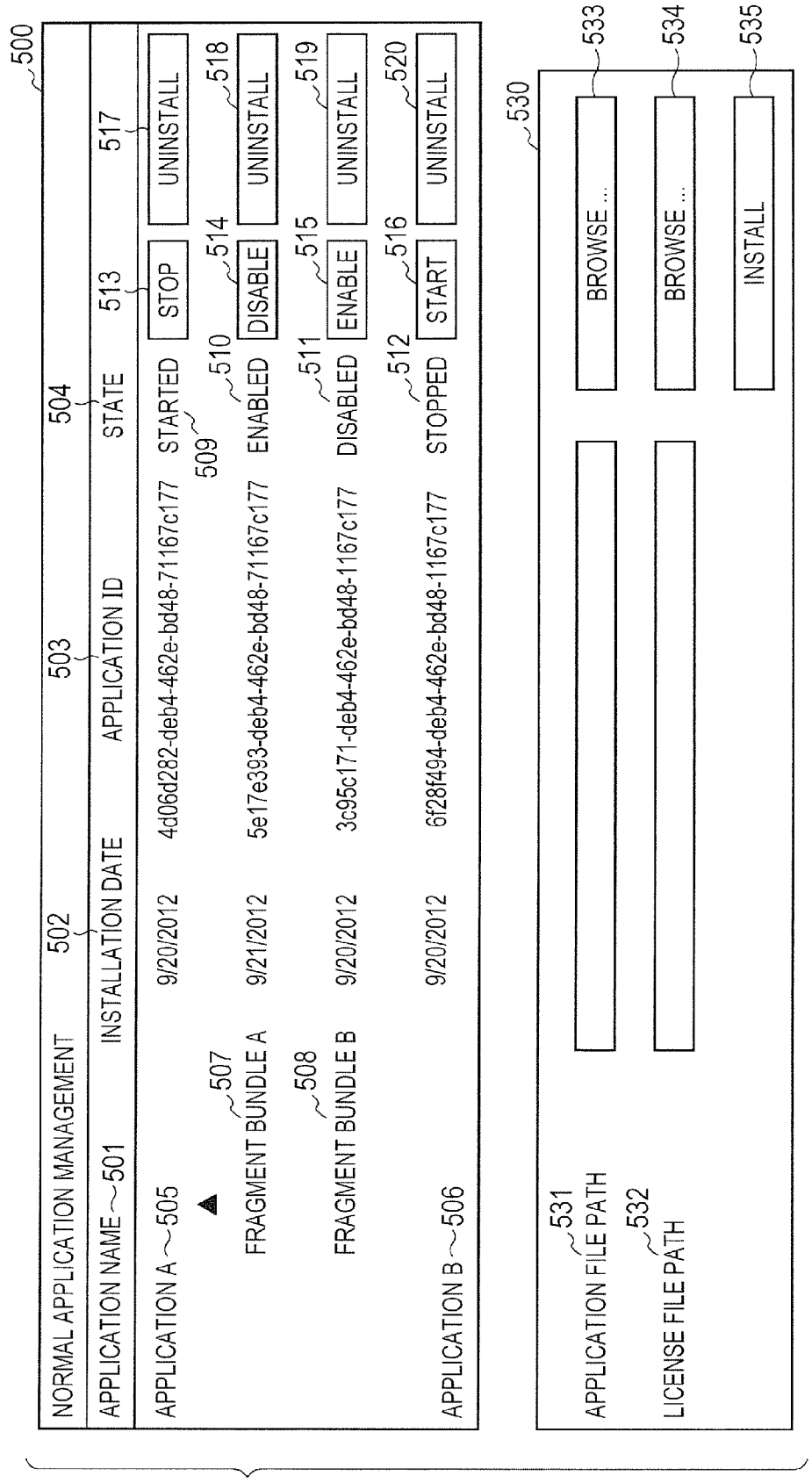
FIG. 5 is a diagram for illustrating a UI of an application management screen and an installation screen.

FIG. 3 is a block diagram for illustrating a flow of the user installing an application from a PC 300 onto the image forming apparatus 130. An installation UI 301 of an application, which is formed of WEB pages illustrated in an installation screen 530 of FIG. 5, is displayed on a WEB browser (not shown) of the PC 300, and the user specifies, on the installation UI 301, an application to be installed to carry out its installation. The application management service 208, which receives the application specified on the installation UI 301, passes this application to the installation control service 207. The installation control service 207, which receives an application file, requests the OSGi 206 to install the application, resulting in the installation by the OSGi 206. The installed application is managed by the application management service 208.

Figure 4:
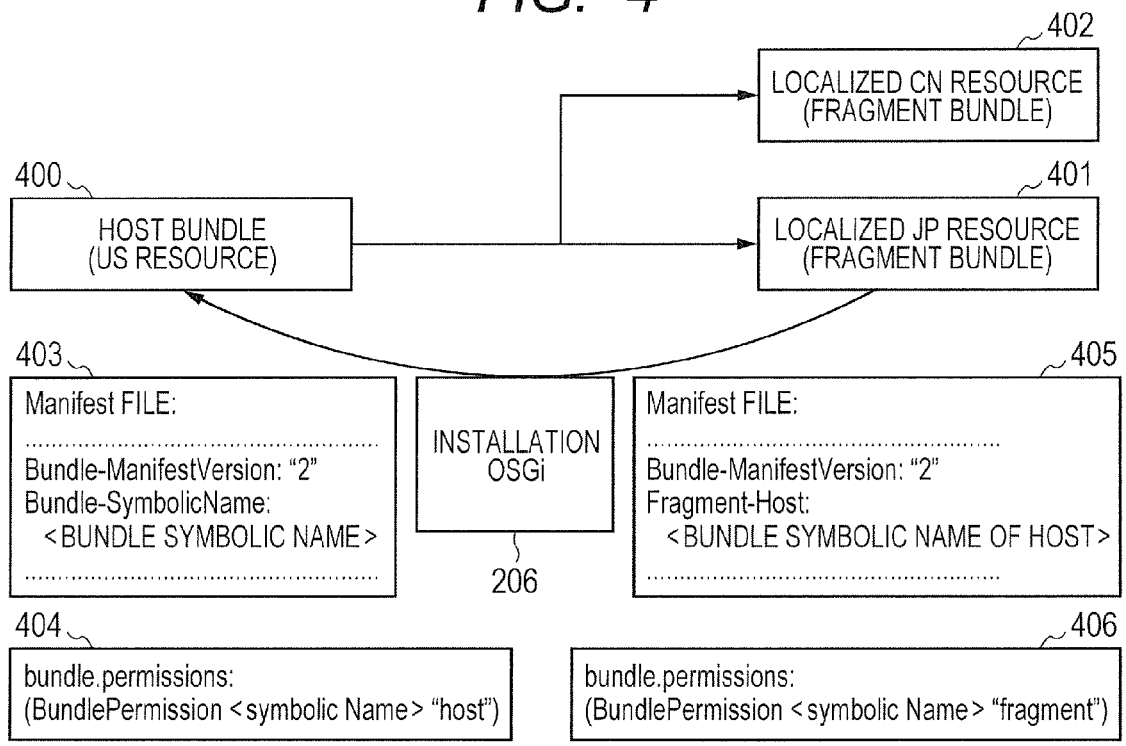
FIG. 4 is a conceptual diagram of a fragment bundle.

FIG. 4 is a diagram for illustrating a concept of the fragment bundle. In this case, an example is illustrated in which fragment bundles 401 and 402 each having a language localization resource are installed to a host bundle 400. In order to install a fragment bundle to a host bundle, in the convention of the OSGi 206, specification of the following manifest and bundle permission is required.

Manifest 403 of Host Bundle

A number "2" is specified in Bundle-ManifestVersion. A name is given in Bundle-SymbolicName uniquely in a framework.

Manifest 405 of Fragment Bundle

The number "2" is specified in Bundle-ManifestVersion. <bundle symbolic name of host>, which is described in the manifest 403 of the host bundle, is specified in Fragment-Host. Matching of this value indicates that the host bundle and the fragment bundle are components of the same application.

Permission 404 of Host Bundle
BundlePermission[BUNDLE SYMBOLIC NAME, HOST]
Permission 406 of Fragment Bundle
BundlePermission[BUNDLE SYMBOLIC NAME, FRAGMENT]

When a fragment bundle is installed with those conditions satisfied, the OSGi 206 identifies a host bundle based on the manifest information of the fragment bundle, and adds a class path of the fragment bundle itself to the class path of the host bundle. Note that, the "class path" specifies a location from which the JAVA (trademark) VM reads a class file when executing a JAVA (trademark) application. Further, the class loader of the host bundle loads all the classes and resources within the fragment bundle. In this case, the "class loader" is an object in charge of loading a class and retrieving a resource, and all the classes are loaded by the class loader into the JAVA (trademark) VM to be able to be used by the application. The class loader of the host bundle executes this loading when the host bundle starts, and hence the loading absolutely needs to be executed after the host bundle is once stopped and the class path is added. Therefore, when the host bundle is not stopped, the installation fails. After installed, the fragment bundle can be used as a part of the host bundle.

In this example, the Japanese resource 401 and the Chinese resource 402, which are the fragment bundles, are installed to the host bundle 400 serving as a main body, and then the host bundle 400 uses those Japanese and Chinese resources. As a result, resource languages can be switched. In other words, the UI of the host bundle is displayed in English, but the host bundle can be created to display the UI in Japanese or Chinese by specifying resource switching on the UI of the host bundle.

When the host bundle is a login application, the following configuration can be employed. That is, the host bundle part carries out basic processing relating to login and the fragment bundle part supplements a UI portion such as login by information of an IC card through passing of the IC card, for example, as in IC card authentication.

Figure 6:
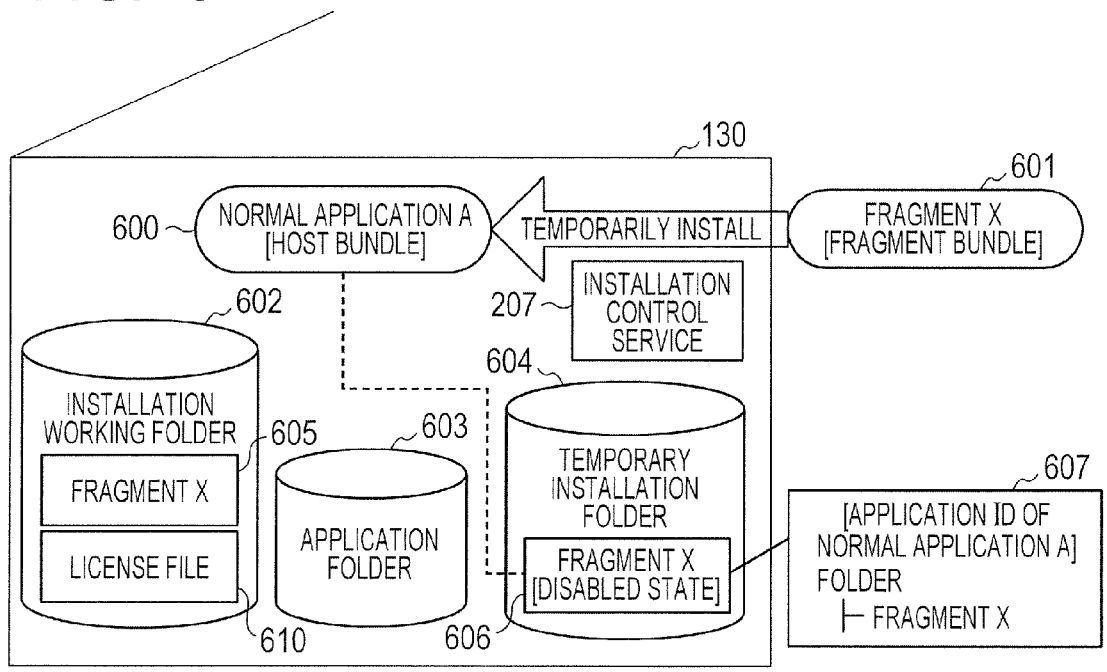
FIG. 6 is a block diagram for illustrating a temporary installation state of the fragment bundle.
Figure 7:
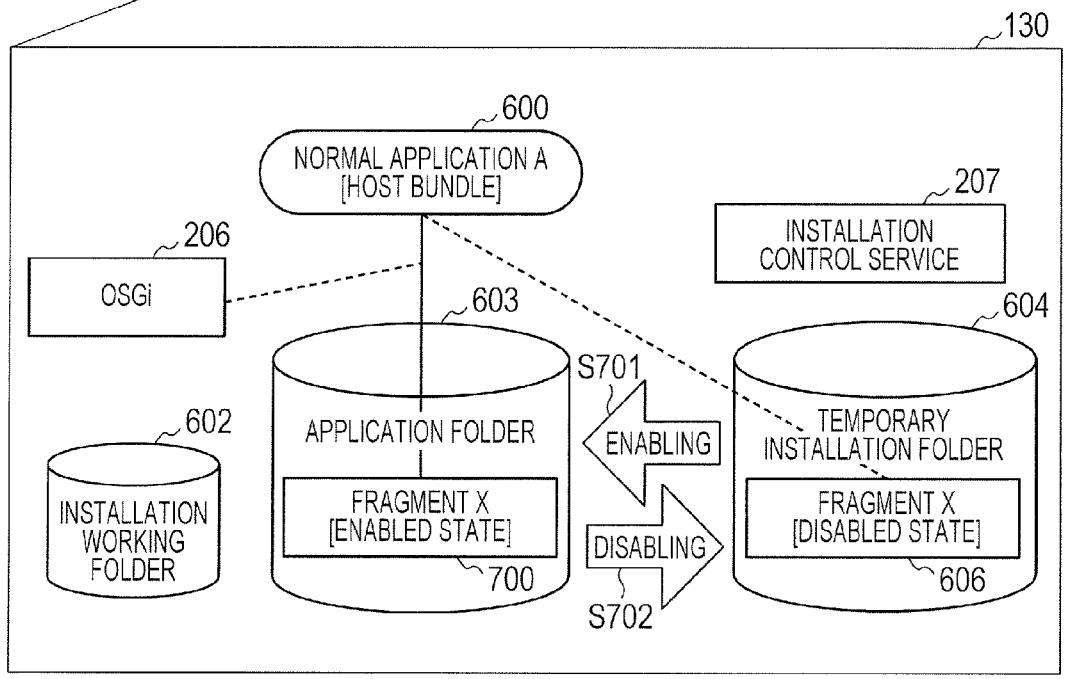
FIG. 7 is a block diagram for illustrating enabling and disabling of the fragment bundle.

With reference to FIG. 5 to FIG. 7, a description is given of how the normal application, the host bundle, and the fragment bundle are managed on an application management screen provided by the application management service. Further, a description is given of temporary installation of the fragment bundle and enabling/disabling of the fragment bundle.

FIG. 5 is a diagram for illustrating a management screen 500 of a normal application and an installation screen 530 in the application management service 208. Although a description is given of the management screen of the normal application, the login application has the same management screen.

The management screen 500 of the normal application is first described. An application name 501 displays the name of a normal application being managed. In this example, two applications, namely, an application A 505 and an application B 506, are being managed. Further, a fragment bundle A 507 and a fragment bundle B 508, which have this application A 505 as the host bundle, are being managed. In this case, those fragment bundles are displayed in relation to the application A 505 in order to make clear the relation to the host bundle. An installation date 502 is a date when each application was installed. An application ID 503 displays an application ID that is assigned uniquely to each application.

A state 504 represents a state of each application. When the state of an application is started, "started" is displayed, whereas "stopped" is displayed when the state of an application is stopped. Further, in the case of the fragment bundle, the fragment bundle is displayed as "enabled" when installed to a host bundle, whereas the fragment bundle is displayed as "disabled" when temporarily installed as illustrated in FIG. 6. A start button 516/stop button 513 is an instruction button to switch between the started state and the stopped state of an application. When the application is in the started state, the stop button is displayed, whereas the start button is displayed when the application is in the stopped state. An enable button 515/disable button 514 is an instruction button to switch between the enabled state and the disabled state of a fragment bundle. When the stop button 513 of an application in the started state (in this example, "application A 505") is pressed, the state 504 is changed to "stopped". On the other hand, when the start button 516 of an application in the stopped state (in this example, "application B 506") is pressed, the state 504 is changed to "started". When the disable button 514 of an application in the enabled state (in this example, "fragment bundle A 507") is pressed, the state 504 is changed to "disabled". On the other hand, when the enable button 515 of an application in the disabled state (in this example, "fragment bundle B 508") is pressed, the state 504 is changed to "enabled".

Uninstall buttons 517 to 520 are instruction buttons to uninstall respective applications. The uninstallation of a fragment bundle only targets the fragment bundle. For example, when the uninstall button 518 of the fragment bundle A 507 is pressed, only the fragment bundle A 507 is uninstalled. On the other hand, when the uninstall button 517 of the application A 505 serving as a host bundle is pressed, the fragment bundle A 507 and the fragment bundle B 508, which are in relation to the application A 505, are also uninstalled at the same time.

Next, the installation screen 530 is described. A browse button 533 displays a screen for selecting a file path. When an application file is specified in that screen, a path to the application file is input to an application file path 531. Some applications need license files for decoding the applications in installation processing in terms of security and business. In that case, when a browse button 534 is pressed, a screen for selecting a file path is displayed. Then, when a license file is specified in the same manner as the application specification, a path to the license file is input to a license file path 532. When an install button 535 is pressed, the application that is specified in the application file path 531 starts to be installed. When a fragment bundle is specified to be installed, the fragment bundle is once temporarily installed.

FIG. 6 is a block diagram for illustrating a temporary installation state of a fragment bundle. FIG. 6 is an illustration of a case in which a fragment X 601, which is a fragment bundle, is temporarily installed to a normal application A 600, which is a host bundle.

The installation control service 207 decodes the fragment X 601 with use of a license file 610 that is specified at the same time, and places the fragment X 601 in an installation working folder 602. After that, the installation control service 207 identifies that the host bundle is a normal application A based on the host bundle information described in the manifest of the decoded fragment X 605, and then places the fragment X 605 in a temporary installation folder 604. The fragment bundle placed in this temporary installation folder 604 is in the temporarily installed state, and is not managed by the OSGi 206. Further, as indicated by the reference numeral 607, a fragment X 606 is placed in a folder whose name is a unique application ID of the normal application A, which is a host bundle.

FIG. 7 is a block diagram for illustrating a flow of enabling the fragment bundle X 606, which is temporarily installed in FIG. 6. The installation control service 207 carries out processing of enabling the fragment X 606, which is installed in the disabled state, in response to an enable instruction S701 from the user. The installation control service 207 enables the fragment X 606, that is, installs the fragment X 606 to the host bundle, resulting in the installation of the fragment X 606 onto an application folder 603. At this state, the fragment X 606 is managed by the OSGi 206, and the OSGi 206 holds a relationship between the normal application A and the fragment X. On the other hand, the installation control service 207 carries out processing of disabling a fragment X 700, which is installed in the enabled state, in response to a disable instruction S702 from the user. The fragment X 700 is again placed in the temporary installation folder 604 in the disabled state due to the disable processing.

Figure 8:
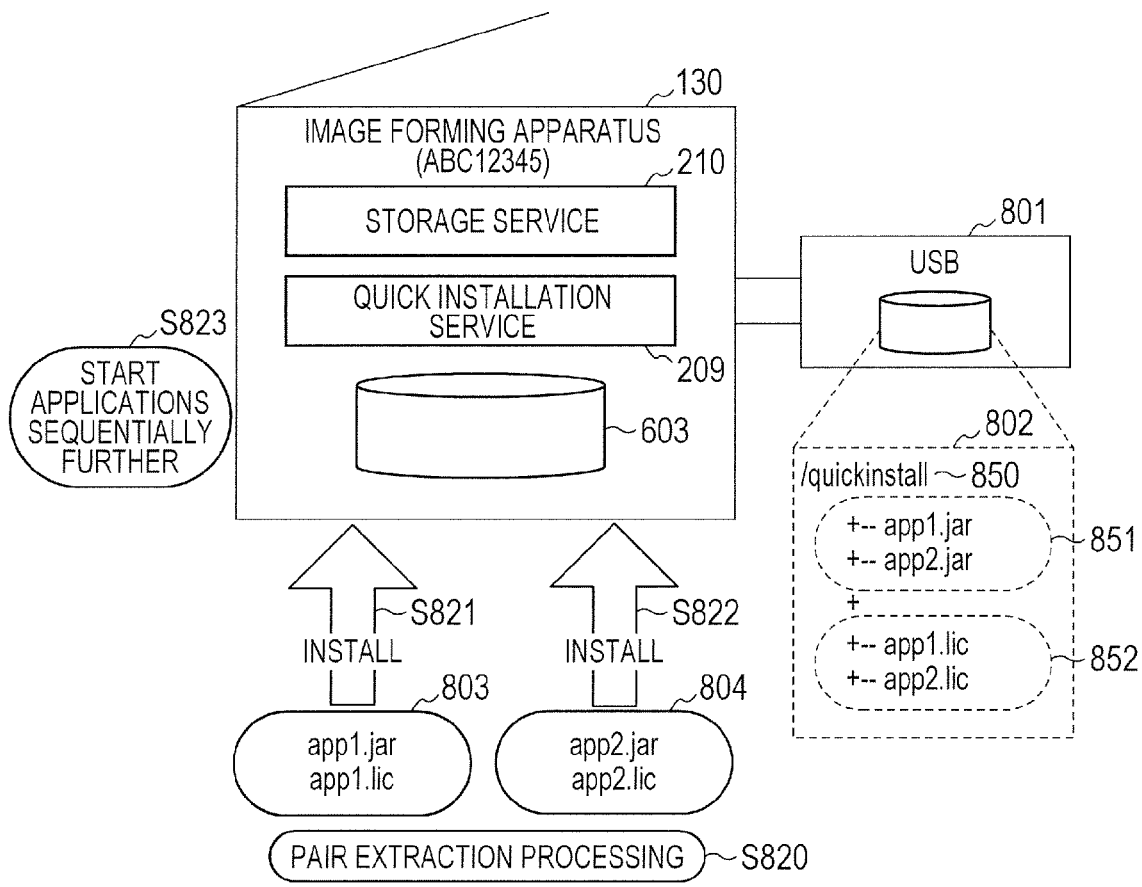
FIG. 8 is a block diagram for illustrating basic quick installation in a related-art quick installation service.

Next, a description is given of related-art basic quick installation with reference to FIG. 8 to FIG. 11. FIG. 8 is a block diagram for illustrating quick installation carried out by the quick installation service. It is assumed that only normal applications are to be installed.

A storage 802 of a USB memory 801 contains an installation target folder 850 (quickinstall), and the following files are placed in the folder. That is, the files are a plurality of application files 851 (extension jar) and a plurality of license files 852 (extension lic) for decoding those applications. The image forming apparatus 130 is assigned a unique serial number "ABC12345" for identifying individual image forming apparatus. When the USB memory 801 is inserted into this image forming apparatus 130, the storage service 210 detects this insertion and notifies the quick installation service 209. This notification triggers the quick installation service 209 to start processing of installing the application files 851 and the license files 852 contained in the installation target folder 850 of the USB memory 801. Then, a pair of an application file and a license file that is appropriate for the image forming apparatus 130, which is assigned the serial number "ABC12345", is extracted by a method illustrated in FIG. 11 (Step S820). In this example, a pair 803 of app1.jar/app1.lic and a pair 804 of app2.jar/app2.lic are extracted. The quick installation service 209 installs those pairs sequentially onto the application folder 603 (Step S821, Step S822). Further, after all the installation is complete, the quick installation service 209 starts the applications sequentially (Step S823).

Figure 9:
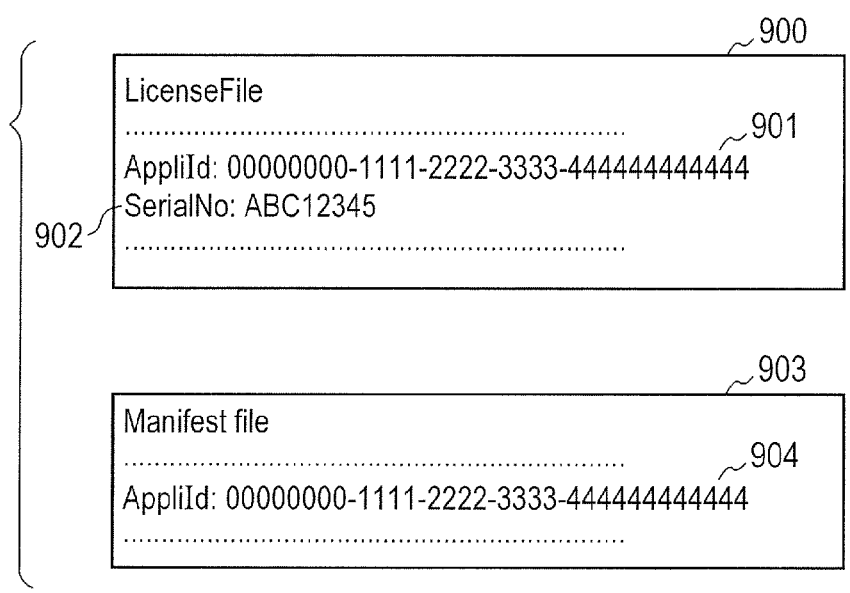
FIG. 9 is a diagram for illustrating a license file and a manifest of a bundle.

FIG. 9 is an illustration of a license file 900 and a manifest file 903 contained in an application file. An application ID 901 of an application to which a license file 900 corresponds is described in this license file. On the other hand, the manifest file 903 is assigned an application ID 904 of that application. Therefore, a pair of an application file and a license file can be created by collating those values.

Further, a serial number 902 of the image forming apparatus 130 for which installation is executable by the license file 900 is described in this license file. On the other hand, as illustrated in FIG. 8, the unique serial number "ABC12345" for identifying the image forming apparatus is assigned. Therefore, a license file appropriate for the image forming apparatus can be found by collating those values. Further, the value of the serial number 902 allows the designation of the wild card *. In this case, the license can be used by any image forming apparatus irrespective of its serial number.

Figure 10:
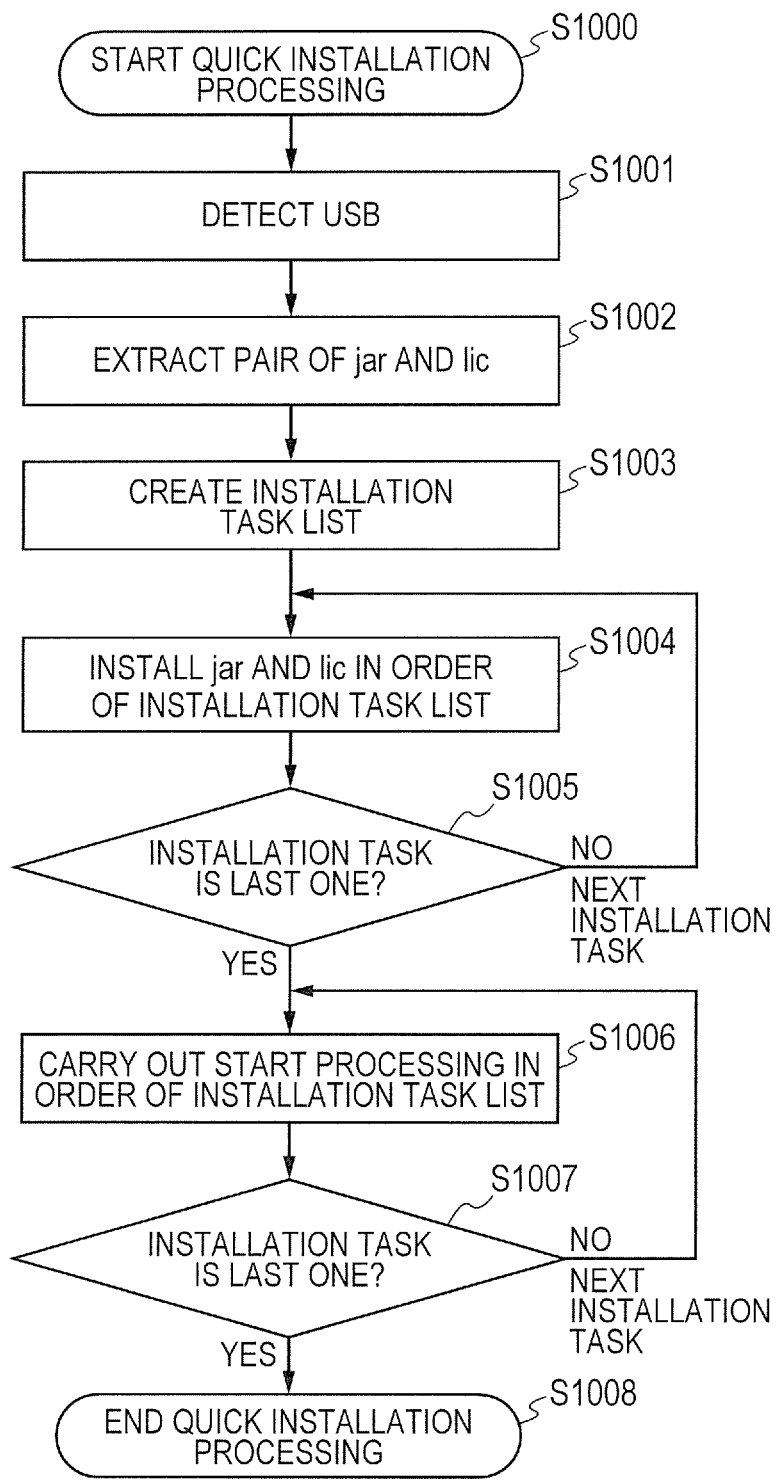
FIG. 10 is a flowchart for illustrating quick installation in the related-art quick installation service.

FIG. 10 is a flowchart for illustrating the quick installation in the quick installation service 209. First, in Step S1000, quick installation processing is started. When, in Step S1001, the quick installation service 209 detects an event notification of USB memory insertion from the storage service 210, in Step S1002, the quick installation service 209 extracts pairs of an application file (jar) and a license file (lic). The method of extracting the pairs is illustrated in FIG. 11.

The extracted pairs of jar and lic are registered in an installation task list in the extraction order, and the installation task list is created in Step S1003. The "installation task list" refers to a list in accordance with which installation and start of an application are carried out. In Step S1004, the quick installation service 209 installs jar and lic that are registered as the first task in the installation task list. In Step S1005, the quick installation service 209 confirms whether or not the installation task is the last one, and when there are any other installation tasks left in the installation task list, the quick installation service 209 returns to Step S1004 to continue processing. In this way, the quick installation service 209 proceeds to Step S1006 after all the installation tasks in the installation task list are complete.

In Step S1006, the quick installation service 209 then carries out processing of starting an application for jar that is registered as the first task in the installation task list. In Step S1007, the quick installation service 209 confirms whether or not the installation task is the last one, and when there are any other installation tasks left in the installation task list, the quick installation service 209 returns to Step S1006 to continue processing. In this way, the quick installation service 209 proceeds to Step S1008 to end the quick installation processing after the starts of applications are complete for all the installation tasks in the installation task list.

Figure 11:
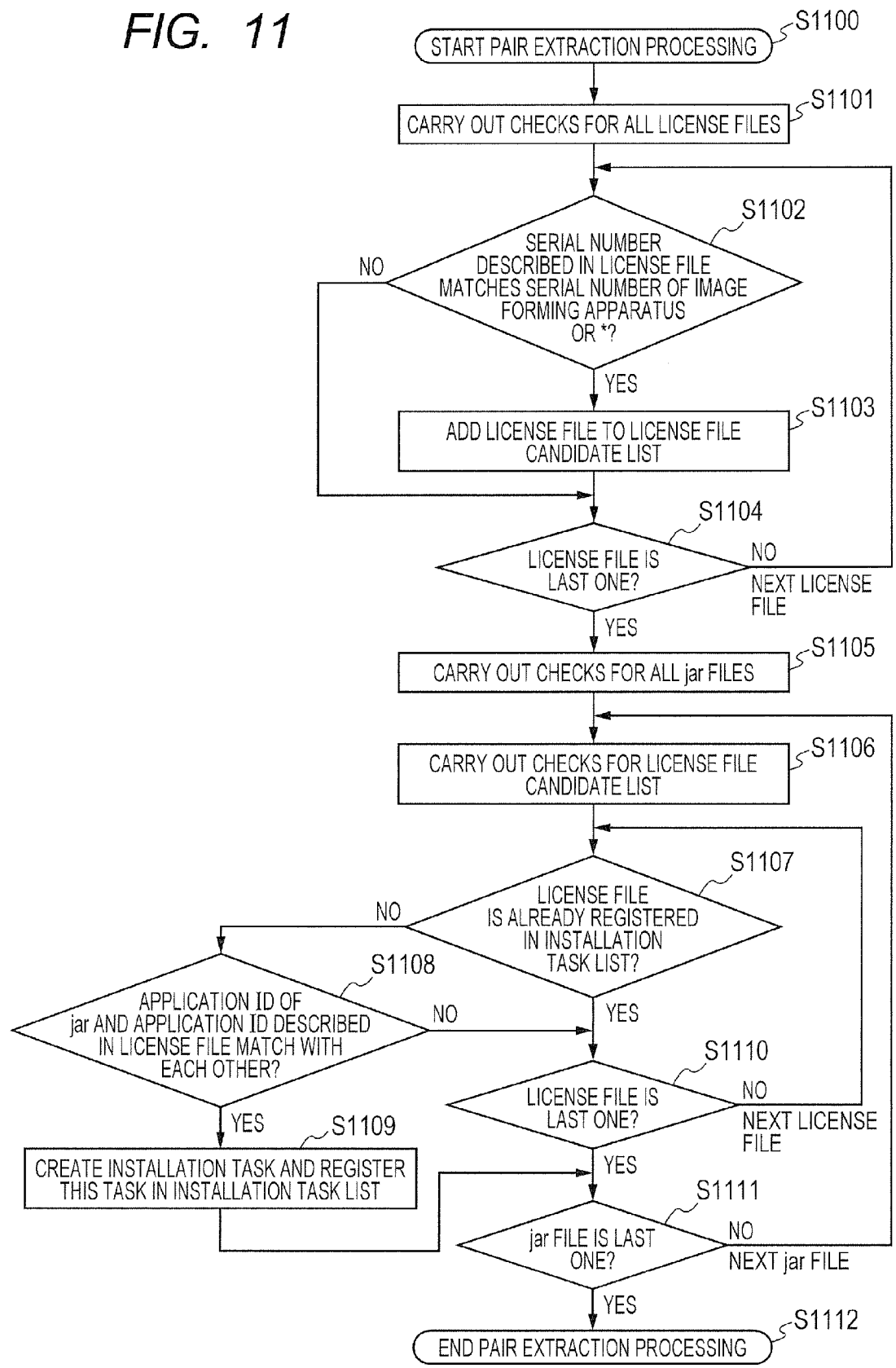
FIG. 11 is a flowchart for illustrating processing of extracting a pair of jar and lic in the related-art quick installation service.

FIG. 11 is a flowchart for illustrating processing of extracting a pair of jar and lic in the quick installation service 209. First, in Step S1100, the processing of extracting a pair is started. In Step S1101, the following check is carried out for all the license files in the installation target folder 850. In Step S1102, the quick installation service 209 determines whether or not the serial number 902 described in the license file matches the serial number of the image forming apparatus that is an installation target. Otherwise, the quick installation service 209 determines whether or not the wild card * is designated at the serial number 902.

As a result of Step S1102, when the serial number 902 matches the serial number of the image forming apparatus or the wild card is designated at the serial number, the quick installation service 209 proceeds to Step S1103 to add the license file to a license file candidate list, and proceeds to Step S1104. As a result of Step S1102, when the serial number 902 does not match the serial number of the image forming apparatus, the quick installation service 209 proceeds to Step S1104 to determine whether or not all the license files are checked. When there are any other license files left to be checked, the quick installation service 209 returns to Step S1102 to continue processing. In this way, after checks of all the license files are complete, the quick installation service 209 proceeds to Step S1105. At this point, the license file candidate list whose license files are available to the image forming apparatus 130 is created, and hence the quick installation service 209 next retrieves applications corresponding to those license files.

In Step S1105, the following check is carried out for all the applications in the installation target folder 850. In Step S1106, the check is carried out for the license file candidate list. In Step S1107, when the license file is already registered in the installation task list, the quick installation service 209 proceeds to Step S1110. When the license file is not registered, the quick installation service 209 proceeds to Step S1108 to determine whether or not the application ID 904 assigned to the manifest of the application and the application ID described in the license file match with each other. When those application IDs do not match with each other, the quick installation service 209 proceeds to Step S1110. When those application IDs match with each other, the quick installation service 209 proceeds to Step S1109 to generate an installation task and register this task in the installation task list, and proceeds to Step S1111. In Step S1110, the quick installation service 209 confirms whether or not the license file is the last one in the license file candidate list, and when there are any other license file candidates left in the license file candidate list, the quick installation service 209 returns to Step S1107 to carry out processing for the next license file candidate.

In this way, after checks of all the license file candidates are complete, the quick installation service 209 proceeds to Step S1111. In Step S1111, the quick installation service 209 confirms whether or not the application is the last one in the installation target folder 850, and when there are any other application files left in the installation target folder 850, the quick installation service 209 returns to Step S1106 to carry out processing for the next application. In this way, after checks of all the application files are complete, the quick installation service 209 proceeds to Step S1112 to end the pair extraction processing.

First Embodiment

A description is given of a configuration of a first embodiment of the present invention with reference to FIG. 12 to FIG. 16. Note that, in this embodiment, quick installation of a host bundle (first type of application) and a fragment bundle (second type of application) is carried out.

Figure 12:
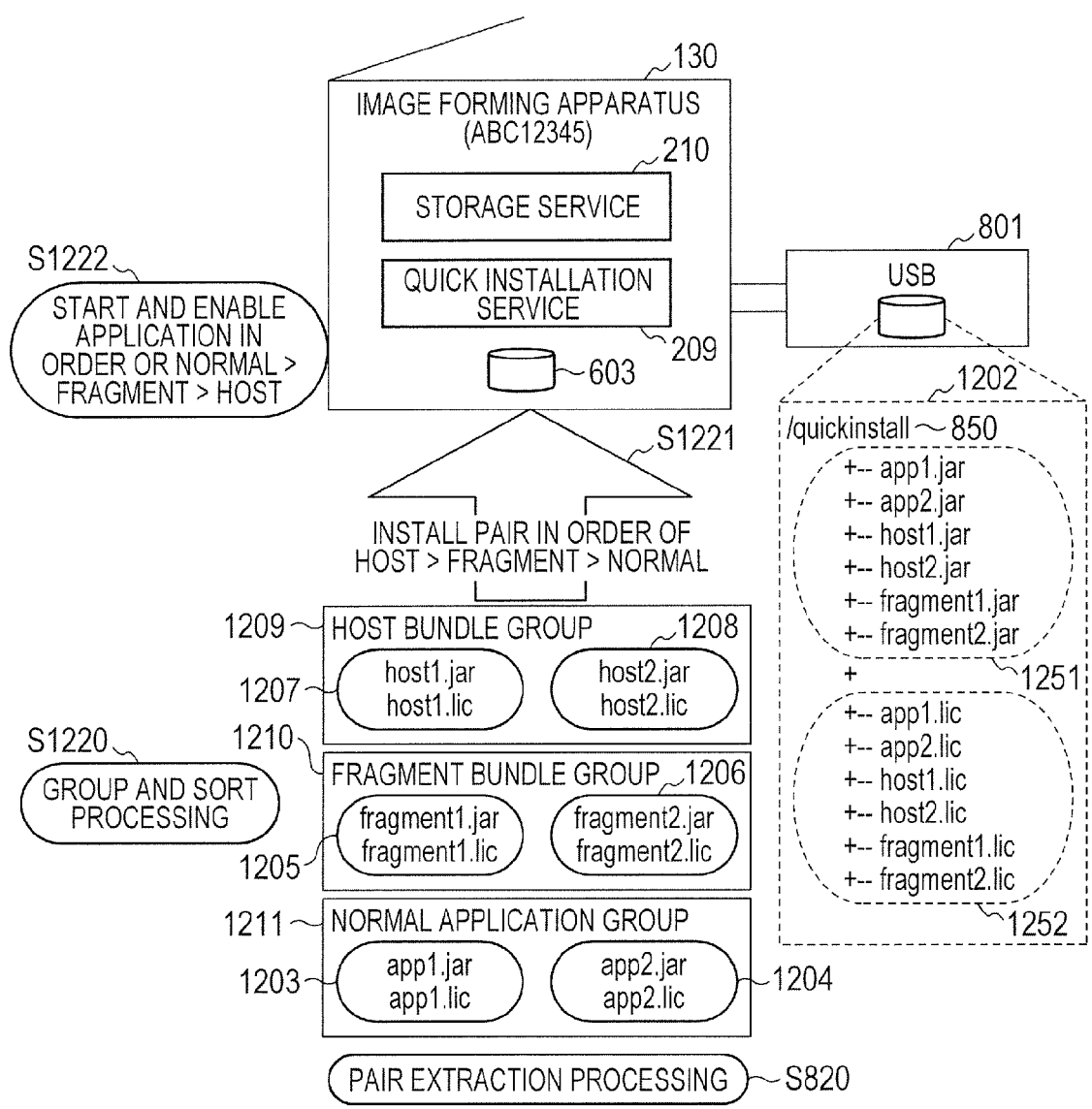
FIG. 12 is a block diagram for illustrating quick installation including a host bundle and the fragment bundle according to a first embodiment of the present invention.

FIG. 12 is a block diagram for illustrating quick installation in the quick installation service, including a host bundle and a fragment bundle. In FIG. 12, a storage 1202 of the USB memory 801 contains the installation target folder 850 (quickinstall), and the following two files are placed in that folder. An application file 1251 contains a plurality of normal applications (app1.jar/app2.jar), host bundles (host1.jar/host2.jar), and fragment bundles (fragment1.jar/fragment2.jar). A license file 1252 (extension lic) is used to decode applications. In this example, the host bundle of fragment1.jar is host1.jar, and the host bundle of fragment2.jar is host2.jar. Further, the host1.jar/host2.jar and fragment1.jar/fragment2.jar are not login applications.

The image forming apparatus 130 is assigned a unique serial number "ABC12345" for identifying individual image forming apparatus. When the USB memory 801 is inserted into the image forming apparatus 130, the storage service 210 detects this insertion and notifies the quick installation service 209. This notification triggers the quick installation service 209 to start processing of installing the application files 1251 and the license files 1252 contained in the installation target folder 850 of the USB memory 801. Then, a pair of an application file and a license file that is appropriate for the image forming apparatus 130, which is assigned the serial number "ABC12345", is extracted by a method illustrated in FIG. 11 (Step S820). In this case, an extracted pair is as follows. That is, a pair 1203 (app1.jar/app1.lic) and a pair 1204 (app2.jar/app2.lic) are extracted in a normal application group 1211. A pair 1205 (fragment1.jar/fragment1.lic) and a pair 1206 (fragment2.jar/fragment2.lic) are extracted in a fragment bundle group 1210. A pair 1207 (host1.jar/host1.lic) and a pair 1208 (host2.jar/host2.lic) are extracted in a host bundle group 1209.

The quick installation service 209 then groups the applications into three, namely, the host bundle, the fragment bundle, and the normal application, based on the manifests of the applications to sort the installation tasks in order of host bundle>fragment bundle>normal application (Step S1220). Next, in Step S1221, the quick installation service 209 installs those pairs in the following order. That is, the quick installation service 209 first installs the pair 1207 (host1.jar/host1.lic) and the pair 1208 (host2.jar/host2.lic) of the host bundle group 1209. Next, the quick installation service 209 installs the pair 1205 (fragment1.jar/fragment1.lic) and the pair 1206 (fragment2.jar/fragment2.lic) of the fragment bundle group 1210. Finally, the quick installation service 209 installs the pair 1203 (app1.jar/app1.lic) and the pair 1204 (app2.jar/app2.lic) of the normal application group 1211. In this way, the host bundle is ensured to be installed earlier than the fragment bundle. Therefore, the restriction 2 in the above-mentioned problem (restriction that host bundle absolutely needs to be installed in advance when fragment bundle is installed because fragment bundle does not operate independently) can be avoided.

After all the installation is complete, in Step S1222, the quick installation service 209 starts and enables the applications in the following order. That is, the quick installation service 209 first starts the pair 1203 (app1.jar/app1.lic) and the pair 1204 (app2.jar/app2.lic) of the normal application group 1211. Next, the quick installation service 209 enables the pair 1205 (fragment1.jar/fragment1.lic) and the pair 1206 (fragment2.jar/fragment2.lic) of the fragment bundle group 1210. Finally, the quick installation service 209 starts the pair 1207 (host1.jar/host1.lic) and the pair 1208 (host2.jar/host2.lic) of the host bundle group 1209. As a result, the fragment bundle is ensured to be enabled earlier than the host bundle. Therefore, the restriction 1 in the above-mentioned problem (restriction that host bundle is required to be stopped when fragment bundle is installed) can be avoided.

Figure 13:
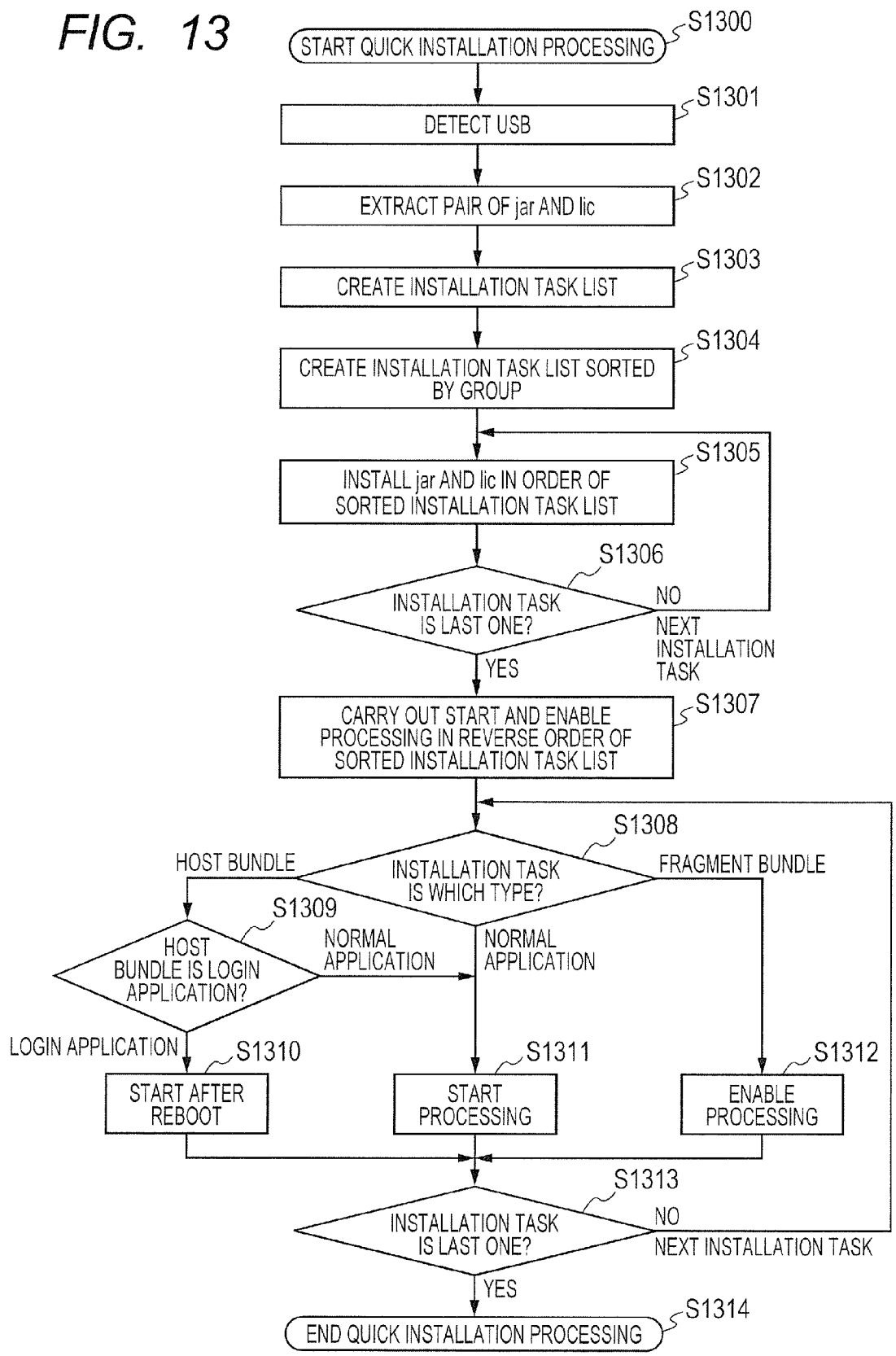
FIG. 13 is a flowchart for illustrating quick installation including the host bundle and the fragment bundle according to the first embodiment.

FIG. 13 is a flowchart of quick installation in the quick installation service 209, including a host bundle and a fragment bundle. First, in Step S1300, quick installation processing is started. When, in Step S1301, the quick installation service 209 detects an event notification of USB memory insertion from the storage service 210, in Step S1302, the quick installation service 209 extracts pairs of an application file (jar) and a license file (lic). The method of extracting the pairs is the same as the one illustrated in FIG. 11.

Figure 14:
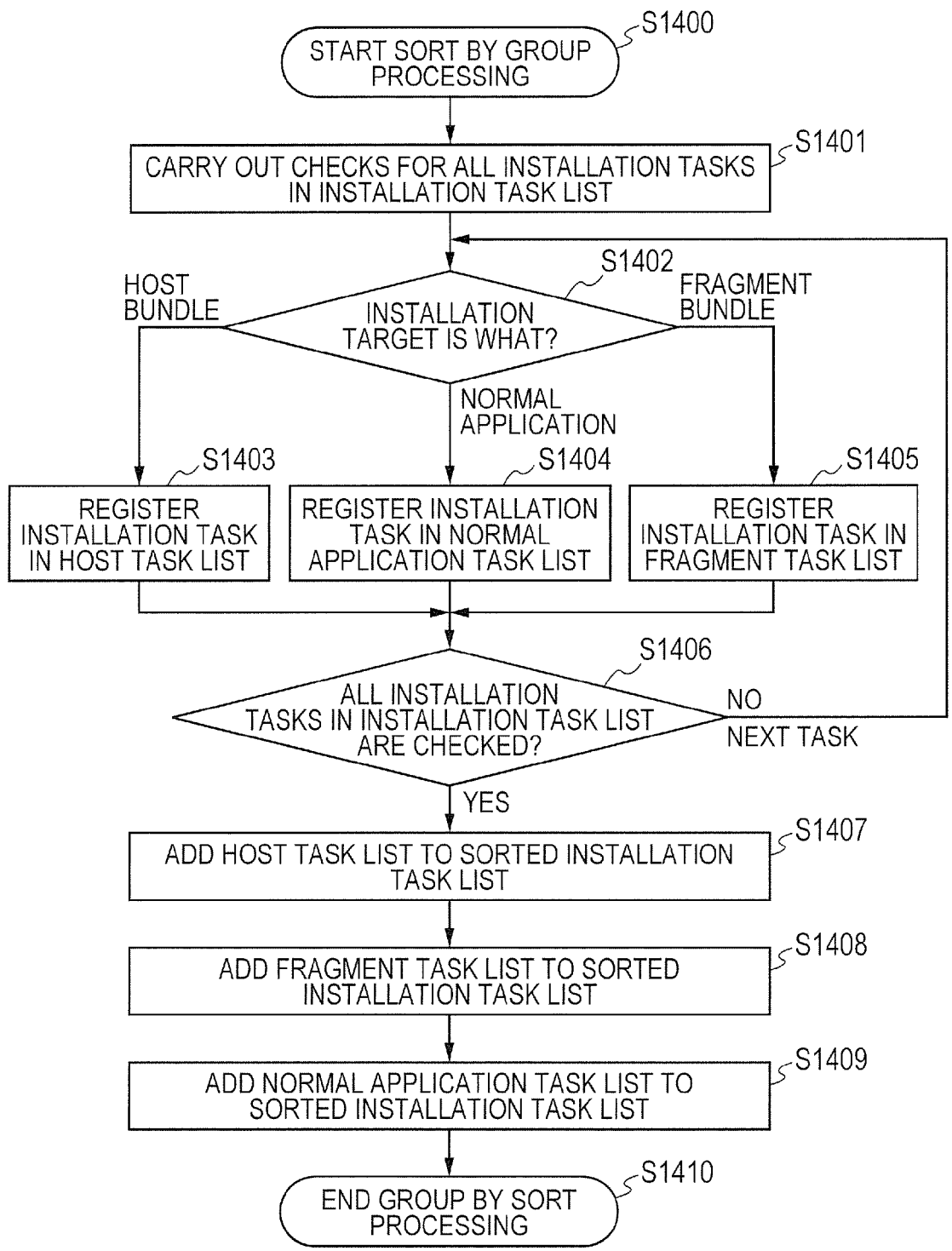
FIG. 14 is a flowchart for illustrating processing of sorting installation tasks by group according to the first embodiment.

The extracted pairs of jar and lic are registered in the installation task list in the extraction order, and the installation task list is created in Step S1303. Next, in Step S1304, the installation task list created in Step S1303 is sorted by group to create a sorted installation task list. The method of creating this sorted installation task list is illustrated in FIG. 14.

In Step S1305, the quick installation service 209 installs jar and lic that are registered as the first task in the sorted installation task list. In Step S1306, the quick installation service 209 confirms whether or not the installation task is the last one, and when there are any other installation tasks left in the sorted installation task list, the quick installation service 209 returns to Step S1305 to continue processing. In this way, the quick installation service 209 proceeds to Step S1307 after the installation is complete for all the installation tasks in the installation task list.

In Step S1307, the quick installation service 209 then carries out processing of starting and enabling an application for jar that is registered as the last task in the sorted installation task list. In Step S1308, the quick installation service 209 determines the type of the target application of the installation task. When the application is the host bundle, the quick installation service 209 proceeds to Step S1309, when the application is the normal application, the quick installation service 209 proceeds to Step S1311, and when the application is the fragment bundle, the quick installation service 209 proceeds to Step S1312.

In Step S1309, the quick installation service 209 determines whether or not the host bundle is a login application. When the host bundle is a login application, the quick installation service 209 proceeds to Step S1310. In the case of a login application, in order for the login application to be started, a currently started login application needs to be switched to this login application, thereby necessitating a reboot. Thus, in Step S1310, the quick installation service 209 puts the login application in a state of start after reboot, and proceeds to Step S1313. When the host bundle is a normal application, the quick installation service 209 proceeds to Step S1311. In Step S1311, the quick installation service 209 carries out processing of starting the application and proceeds to Step S1313. In Step S1312, the quick installation service 209 carries out processing of enabling the fragment bundle and proceeds to Step S1313.

In Step S1313, the quick installation service 209 confirms whether or not the installation task is the last one, and when there are any other installation tasks left in the installation task list, the quick installation service 209 returns to Step S1308 to continue processing. In this way, after the starts of applications are complete for all the installation tasks in the installation task list, the quick installation service 209 proceeds to Step S1314 to end the quick installation processing.

FIG. 14 is a flowchart of processing of creating a sorted installation task list by sorting the installation tasks by group in Step S1304 of FIG. 13. First, in Step S1400, sort by group processing is started. In Step S1401, the quick installation service 209 checks all the installation tasks in the installation task list created in Step S1303, and in Step S1402, determines what the installation target of the installation task is.

In Step S1402, when the installation target is the host bundle, the quick installation service 209 proceeds to Step S1403, when the installation target is the normal application, the quick installation service 209 proceeds to Step S1404, and when the installation target is the fragment bundle, the quick installation service 209 proceeds to Step S1405. In Step S1403, the quick installation service 209 registers the installation task in the host task list, and proceeds to Step S1406. In Step S1404, the quick installation service 209 registers the installation task in the normal application task list, and proceeds to Step S1406. In Step S1405, the quick installation service 209 registers the installation task in the fragment task list, and proceeds to Step S1406. In Step S1406, the quick installation service 209 confirms whether or not the installation task is the last one, and when there are any other installation tasks left in the installation task list, the quick installation service 209 returns to Step S1402 to continue processing. In this way, after processing is complete for all the installation tasks in the installation task list, the quick installation service 209 proceeds to Step S1407.

In Step S1407, the quick installation service 209 adds the host task list to the sorted installation task list, and proceeds to Step S1408. In Step S1408, the quick installation service 209 adds the fragment task list to the sorted installation task list, and proceeds to Step S1409. In Step S1409, the quick installation service 209 adds the normal application task list to the sorted installation task list, and proceeds to Step S1410. In Step S1410, the quick installation service 209 ends the sort by group processing. In this way, the sorted installation task list is now a task list having an order of host bundle>fragment bundle>normal application.

Figure 15:
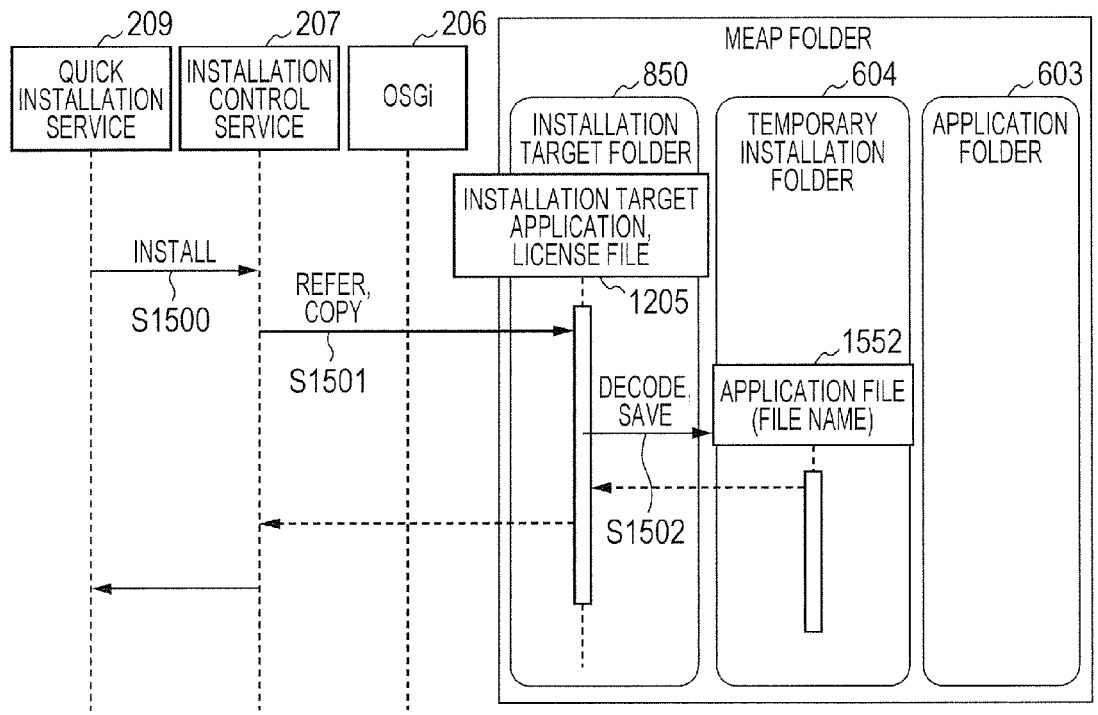
FIG. 15 is a sequence diagram for illustrating a time when the fragment bundle is temporarily installed from the quick installation service according to the first embodiment.

FIG. 15 is a sequence diagram for illustrating a flow of processing of each service and a flow of data until when the quick installation service 209 temporarily installs the fragment bundle. First, in Step S1500, the quick installation service 209 makes a request to the installation control service 207 for installation. Next, in Step S1501, the installation control service 207 refers to the pair 1205 of a license file and an application to be installed that are in the installation target folder 850 (quickinstall) of the USB memory 801. Then, the installation control service 207 decodes the application with use of the license file. Further, when the installation control service 207 determines the application to be a fragment bundle based on the manifest value of the application, the installation control service 207 changes the file name of the decoded application file 1552 to the application ID of the application, and places the application in the temporary installation folder 604 (Step S1502). Through the processing described above, the fragment bundle is temporarily installed and disabled.

Figure 16:
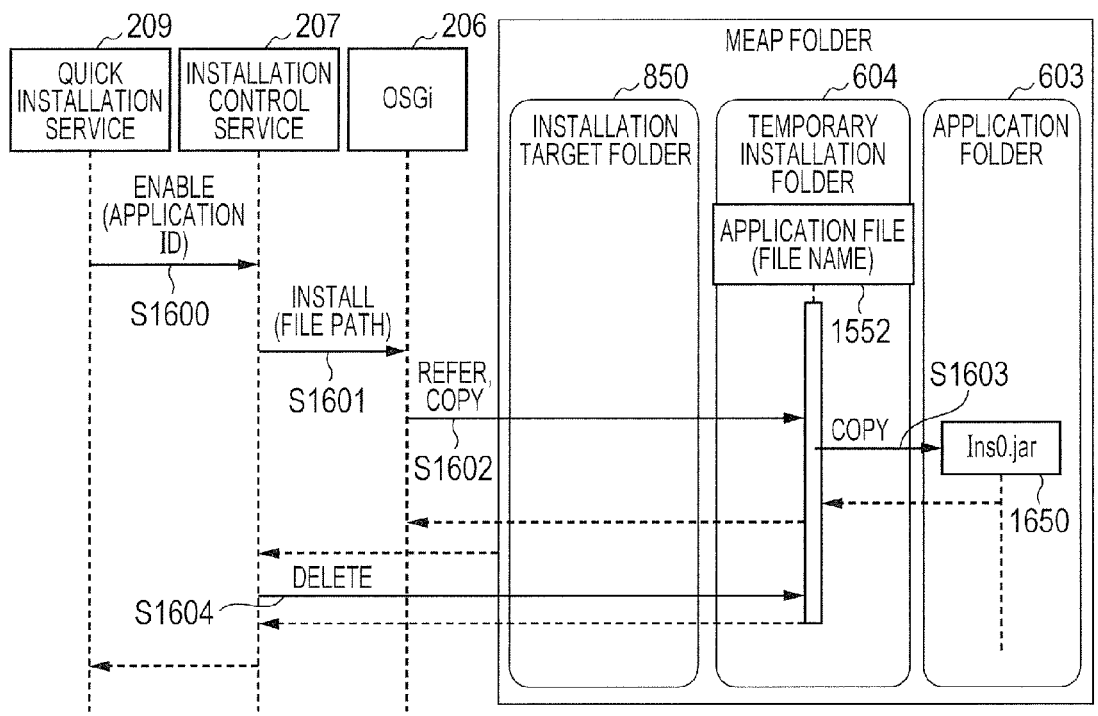
FIG. 16 is a sequence diagram for illustrating a time when an application that is temporarily installed from the quick installation service is enabled according to the first embodiment.

FIG. 16 is a sequence diagram for illustrating a flow of processing of each service and a flow of data until when the quick installation service 209 enables the fragment bundle in the disabled state. First, in Step S1600, the quick installation service 209 makes a request with an attached application ID of the installation target application to the installation control service 207 for enable processing. In Step S1601, the installation control service 207 makes a request to the OSGi 206 for installation by specifying a file path. In this case, the file path is created based on the application ID received from the quick installation service 209. In Step S1602, the OSGi 206 installs the application file 1552 placed in the temporary installation folder, which is indicated by the file path received from the installation control service 207. In Step S1603, the OSGi 206 installs the application file onto the application folder 603 with the name of "ins0.jar" (1650) for installation. After the installation is succeeded, in Step S1604, the installation control service 207 deletes the application file 1552 placed in the temporary installation folder. In this manner, the fragment bundle is enabled to be in the enabled state.

As described above, in the first embodiment, the quick installation including the host bundle and the fragment bundle can be carried out.

Second Embodiment

In a second embodiment of the present invention, a description is given of processing of installing, to the image forming apparatus having a host bundle already installed thereon, a fragment bundle corresponding to this fragment bundle. In this case, when the host bundle is in a started state, the host bundle needs to be stopped temporarily in order to install the fragment bundle. The user can use the application by returning the host bundle to the started state again after the installation of the fragment bundle.

Figure 17:
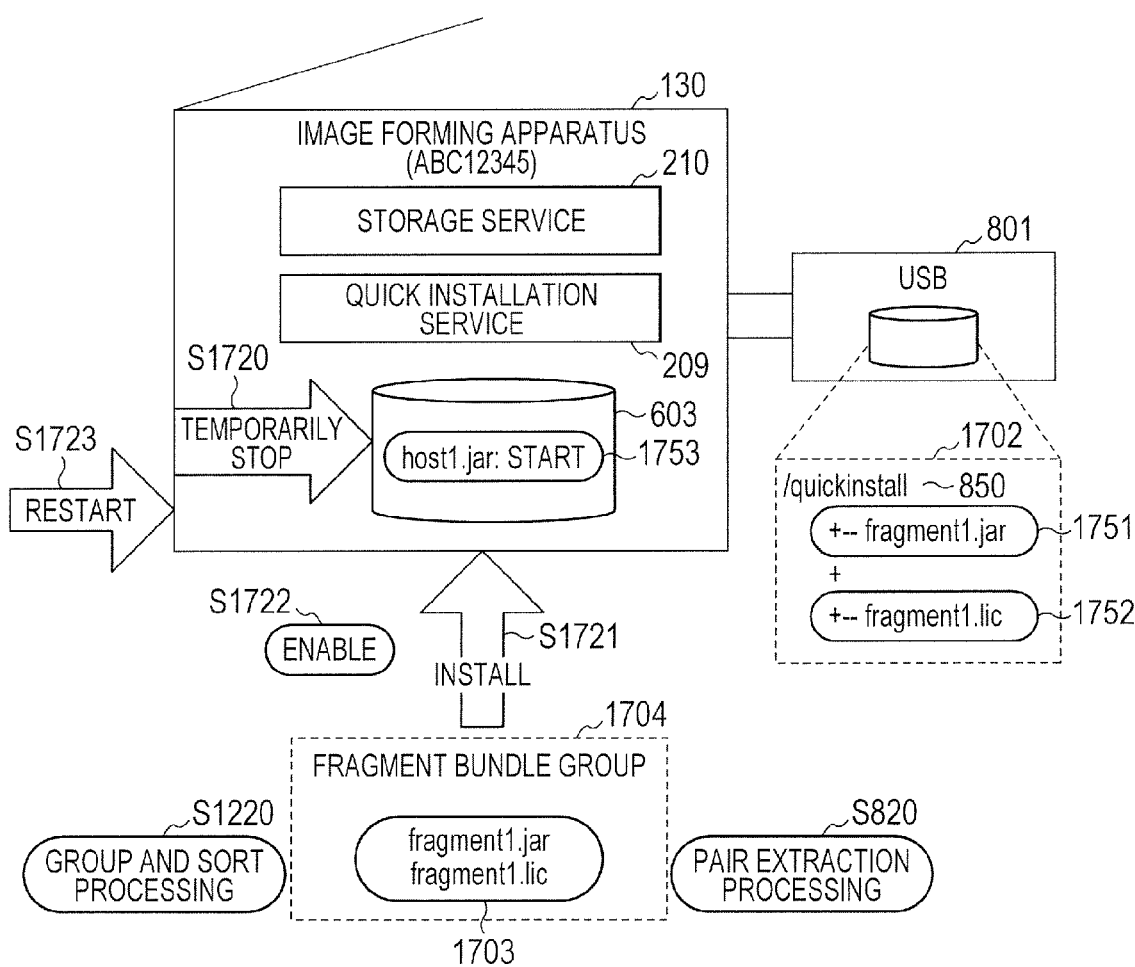
FIG. 17 is a block diagram for illustrating quick installation of an application containing the fragment bundle under a state in which the host bundle is started according to a second embodiment of the present invention.

FIG. 17 is a block diagram for illustrating the second embodiment of the present invention. In this example, it is assumed that a host bundle (host1.jar) 1753 is installed in the application folder 603 in the started state. Further, the host1.jar is a host bundle that is not a login application. A storage 1702 of the USB memory 801 contains the installation target folder 850 (quickinstall), and the following two files are placed in that folder. That is, the files are a fragment bundle 1751 (fragment1.jar) and a license file 1752 (extension lic) for decoding the application. It is assumed that the host bundle of fragment1.jar is host1.jar.

When the USB memory 801 is inserted into the image forming apparatus 130, this insertion triggers the quick installation service 209 to start processing of installing the following two files. That is, the files are the application file 1751 and the license file 1752 contained in the installation target folder 850 of the USB memory 801. Then, a pair of an application file and a license file that is appropriate for the image forming apparatus 130, which is assigned the serial number "ABC12345", is extracted by the method illustrated in FIG. 11 (Step S820). In this case, a pair 1703 (fragment1.jar/fragment1.lic) is extracted. The quick installation service 209 groups this pair 1703 into a fragment bundle group 1704 (Step S1220).

The quick installation service 209 detects that the host bundle 1753, which is a host bundle of the fragment bundle pair 1703 to be installed, is in the started state, and stops this bundle in Step S1720. Next, in Step S1721, the quick installation service 209 installs the pair 1703. After the completion of installation, in Step S1722, the quick installation service 209 enables the fragment bundle of the pair 1703. Finally, in Step S1723, the quick installation service 209 restarts the host bundle 1753. As a result, the host bundle does not need to be stopped when the fragment bundle is installed/enabled.

Figure 18B:
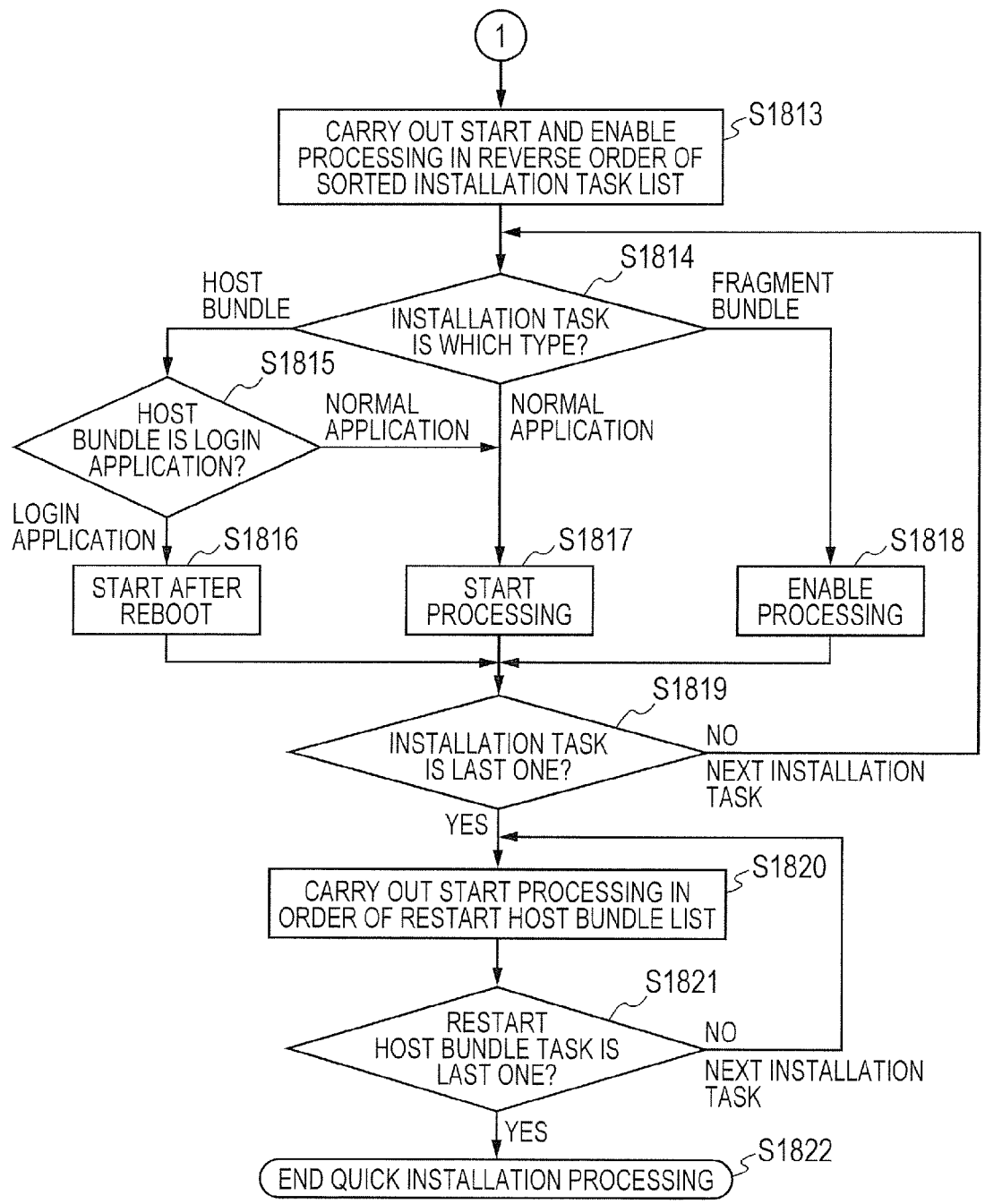

FIG. 18 is a flowchart of quick installation in the quick installation service 209, including a fragment bundle with the state of a host bundle taken into consideration. Note that, the processing of Step S1800 to Step S1805 is the same as that of Step S1300 to Step S1305 illustrated in FIG. 13, and hence the description thereof is omitted.

In Step S1806, the quick installation service 209 determines whether or not the installation target application of the installation task is a fragment bundle. When the installation target application is not a fragment bundle, the quick installation service 209 proceeds to Step S1811, and when the installation target application is a fragment bundle, the quick installation service 209 proceeds to Step S1807. In Step S1807, the quick installation service 209 determines whether or not the host bundle is a login application. When the host bundle is a login application, the quick installation service 209 proceeds to Step S1811, and when the host bundle is not a login application, the quick installation service 209 proceeds to Step S1808.

In Step S1808, the quick installation service 209 determines whether the state of the host bundle is started or stopped. When the state is started, the quick installation service 209 proceeds to Step S1809, and when the state is stopped, the quick installation service 209 proceeds to Step S1811. In Step S1809, the quick installation service 209 stops the host bundle and proceeds to Step S1810. In Step S1810, the quick installation service 209 registers the installation task in the restart host bundle list, and proceeds to Step S1811. In Step S1811, the quick installation service 209 confirms whether or not the installation task is the last one, and when there are any other installation tasks left in the installation task list, the quick installation service 209 returns to Step S1806 to continue processing. In this way, after the installation is complete for all the installation tasks in the installation task list, the quick installation service 209 proceeds to Step S1813.

The start processing and the enable processing of Step S1813 to Step S1819 are the same as those of Step S1307 to Step S1313 illustrated in FIG. 13, and hence the description thereof is omitted. After the start processing and the enable processing are complete for all the installation tasks, in Step S1820, the quick installation service 209 carries out processing of starting the host bundles that are registered in the restart bundle list including host bundles stopped in Step S1809. In Step S1821, the quick installation service 209 confirms whether or not the restart host bundle task is the last one, and when there are any other restart host bundle tasks left in the restart host bundle list, the quick installation service 209 returns to Step S1820 to continue processing. In this way, after the start processing is complete for all the restart host bundle tasks in the restart host bundle list, the quick installation service 209 proceeds to Step S1822. In Step S1822, the quick installation service 209 ends the quick installation processing.

As described above, in the second embodiment, the quick installation of the fragment bundle can be carried out irrespective of the state of the host bundle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-265014, filed Dec. 26, 2014, which is hereby incorporated by reference herein in its entirety.

What is claimed is:

1. An information processing apparatus, comprising:
at least one processor; and
a memory storing instructions which, when executed by the at least one processor, cause the information processing apparatus to function as:
a detection unit configured to detect a connection of a portable medium storing a plurality of applications, the plurality of applications including a first type of application and a second type of application, wherein the first type of application is a host bundle and the second type of application is a fragment bundle that is added to the first type of application to enhance functionality of the first type of application;
a creating unit configured to create, in response to a detection by the detection unit, an installation task list defining an order of installing applications such that the first type of application is installed first and then the second type of application is installed;
an installation unit configured to install the first type of application first and then install the second type of application into the first type of application based on the installation task list created by the creating unit, wherein the second type of application is temporary installed and disabled before installed into the first type of application, and is enabled after installed into the first type of application; and
a control unit configured to start, after installation by the installation unit, the first type of application after enabling the second type of application,
wherein the creating unit checks whether or not a license file that is stored in the portable medium and paired with at least one of the first type of application or the second type of application corresponds to the information processing apparatus, and creates the installation task list without the first type of application or the second type of application paired with the license file that does not correspond to the information processing apparatus.

2. The information processing apparatus according to claim 1, further comprising a unit configured to group the plurality of applications stored in the portable medium into the first type of application and the second type of application.

3. The information processing apparatus according to claim 1, wherein the installation unit is configured to temporarily install the second type of application.

4. The information processing apparatus according to claim 3, wherein the control unit is configured to stop the first type of application when enabling the second type of application having temporarily been installed by the installation unit, and start the first type of stopped application after the enabling of the second type of application.

5. The information processing apparatus according to claim 1, wherein the installation unit is configured to, when the first type of application is started, install the second type of application after the first type of application is stopped, and the control unit is configured to start the first type of application after the installation of the second type of application.

6. The information processing apparatus according to claim 1, wherein the control unit is configured to, when reboot of the information processing apparatus is needed to start the first type of application, put the first type of application in a started state after the reboot of the information processing apparatus.

7. The information processing apparatus according to claim 1, wherein the first type of application comprises an application corresponding to a host bundle of Open Services Gateway Initiative (OSG) and the second type of application comprises an application corresponding to a fragment bundle of OSGi.

8. A control method for an information processing apparatus, comprising:
  detecting a connection of a portable medium storing a plurality of applications, the plurality of applications including a first type of application and a second type of application, wherein the first type of application is a host bundle and the second type of application is a fragment bundle that is added to the first type of application to enhance functionality of the first type of application;
  creating, in response to a detection in the detecting, an installation task list defining an order of installing applications such that the first type of application is installed first and then the second type of application is installed;
  installing the first type of application first and then installing the second type of application into the first type of application based on the created installation task list, wherein the second type of application is temporary installed and disabled before installed into the first type of application, and is enabled after installed into the first type of application; and
  starting, after the installing, the first type of application after enabling the second type of application,
  wherein the creating checks whether or not a license file that is stored in the portable medium and paired with at least one of the first type of application or the second type of application corresponds to the information processing apparatus, and creates the installation task list without the first type of application or the second type of application paired with the license file that does not correspond to the information processing apparatus.

9. A non-transitory computer-readable storage medium having stored thereon a program for causing a computer to execute a control method for an information processing apparatus, the control method comprising:
  detecting a connection of a portable medium storing a plurality of applications, the plurality of applications including a first type of application and a second type of application, wherein the first type of application is a host bundle and the second type of application is a fragment bundle that is added to the first type of application to enhance functionality of the first type of application;
  creating, in response to a detection in the detecting, an installation task list defining an order of installing applications such that the first type of application is installed first and then the second type of application is installed;
  installing the first type of application first and then installing the second type of application into the first type of application based on the created installation task list, wherein the second type of application is temporary installed and disabled before installed into the first type of application, and is enabled after installed into the first type of application; and
  starting, after the installing, the first type of application after enabling the second type of application,
  wherein the creating checks whether or not a license file that is stored in the portable medium and paired with at least one of the first type of application or the second type of application corresponds to the information processing apparatus, and creates the installation task list without the first type of application or the second type of application paired with the license file that does not correspond to the information processing apparatus.

* * * * *